United States Patent

Bantz et al.

[15] 3,701,941
[45] Oct. 31, 1972

[54] MAGNETIC ANOMALY DETECTOR WITH MEANS FOR OBTAINING DIFFERENT TEST FREQUENCIES

[72] Inventors: Walter J. Bantz, Fairfield; Richard J. Pittaro, Stamford, both of Conn.

[73] Assignee: Branson Instruments Incorporated, Stamford, Conn.

[22] Filed: Sept. 28, 1971

[21] Appl. No.: 184,350

[52] U.S. Cl. .................................................. 324/37
[51] Int. Cl. ............................................. G01r 33/12
[58] Field of Search .................................. 324/37, 40

[56] References Cited

UNITED STATES PATENTS 3,478,263   11/1969   Hertschel ..................... 324/40
3,050,678   8/1962   Datt ............................. 324/37

Primary Examiner—Robert J. Corcoran
Attorney—Ervin B. Steinberg

[57] ABSTRACT

A magnetic detecting apparatus comprises a probe having two coils which are moved through a metallic workpiece (tubing) to detect anomalies. The coils are connected to an electronic circuit which includes two oscillators whose output frequencies are subtracted to provide a signal of suitable frequency to the probe coils. Additionally, phase shift means are provided to produce a balancing signal in order to analyze and display the anomaly responsive signal produced by the test coils with respect to phase and amplitude. Different test frequencies are obtained by changing the frequency of one of the oscillators.

20 Claims, 6 Drawing Figures

INVENTORS.
WALTER J. BANTZ
RICHARD J. PITTARO
BY:

INVENTORS.
WALTER J. BANTZ
RICHARD J. PITTARO
BY:
Erwin B. Steinberg

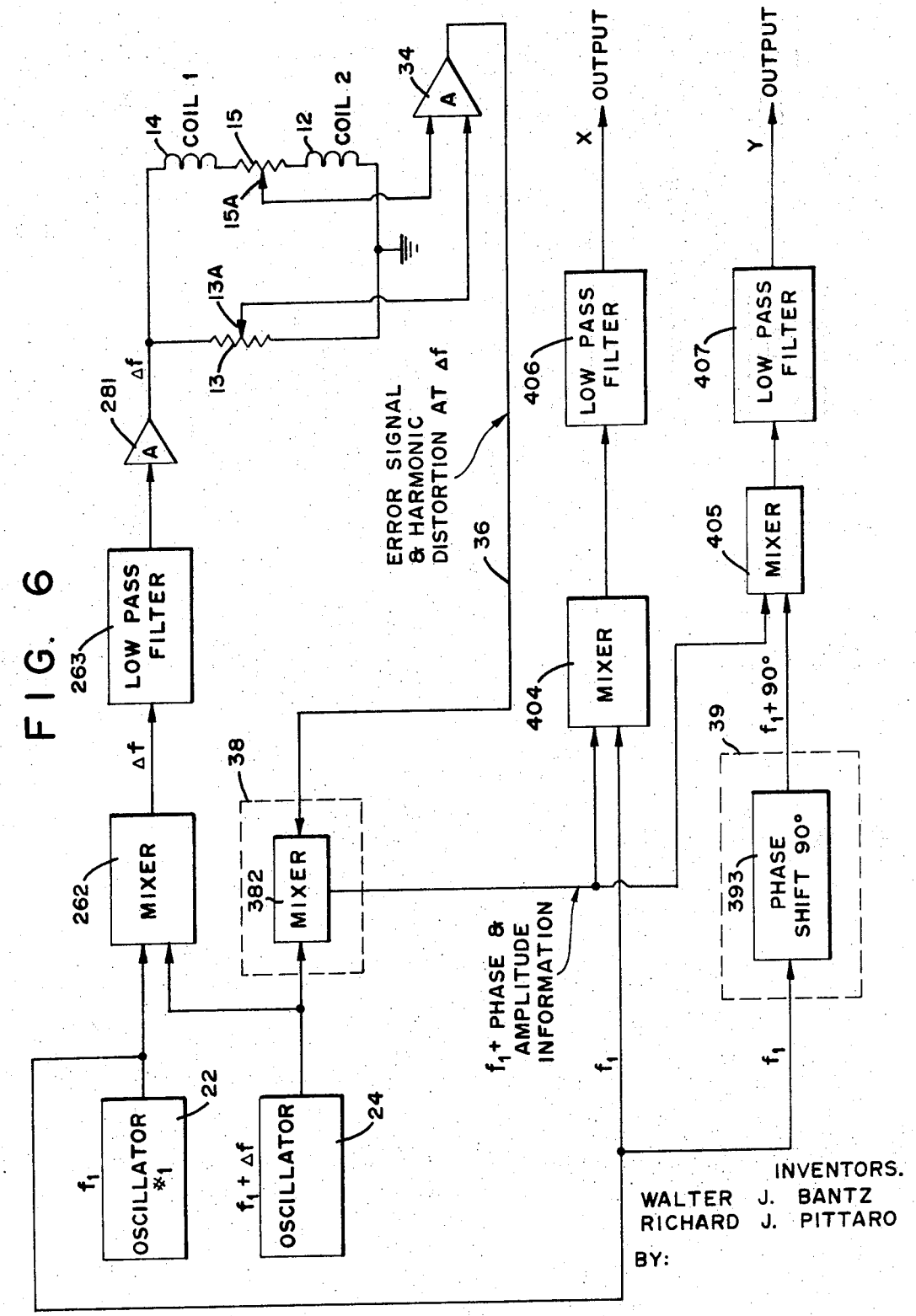

MAGNETIC ANOMALY DETECTOR WITH MEANS FOR OBTAINING DIFFERENT TEST FREQUENCIES

This invention relates to an apparatus for locating flaws and defects in materials capable of conducting electric current and more particularly to a system which will magnetically test with equal efficiency a wide variety of materials having different electrical characteristics.

The prior art, specifically U.S. Pat. No. 3,050,678 issued to Paul L. Datt, dated Aug. 21, 1962, discloses a magnetic testing apparatus of the type indicated hereinbefore, which publication is incorporated herein for reference purposes. The technique of testing and failure analysis using an apparatus as disclosed in the patent reference is described further in a publication entitled "Eddy Current Instrument for Maintenance Inspections" by Frank C. Parker, Materials Evaluation (magazine) Evanston, Illinois, Vol. XXVI, No. 11, November 1968, pp. 29A–36A.

In the apparatus stated heretofore a sensing probe containing two axially spaced annular coils is drawn through metal tubes to be tested and an electronic circuit connected to the probe provides signals indicative of the presence of anomalies in the wall section of the tubular member under test, for instance, deviation from nominal wall thickness, flaws, foreign inclusions and the like. The electronic apparatus disclosed comprises essentially an electrical impedance bridge circuit excited by an alternating current whose frequency is variable in discrete steps over a range from 0.5 to 40 kHz to provide suitable test conditions for materials of different electrical conductivity and wall thickness. In order to accomplish such a frequency change, the prior reference discloses a capacitor bank, variable frequency oscillator means, amplifier means with variable filter means, etc. all for the purpose of switching to different test frequencies and assuring that a signal containing only the proper frequency is applied to the sensing probe and that only anomaly responsive signals at the proper frequency are displayed.

It will be appreciated by those skilled in the art that the provision of a capacitor bank, a multitude of filters, and suitable switching means for those components is not only relatively expensive but also bulky. The present invention overcomes these disadvantages by using a different technique of providing a range of frequencies variable in discrete increments. More specifically, the present invention employs frequency addition and subtraction means in order to obtain a set of frequencies. Moreover, while the prior art discloses a single output signal which is an imbalance signal and means for recording such signal in relation to the probe position within the tubular workpiece using a strip chart recording instrument, the present invention provides two output signals along two perpendicular axes for display on an oscilloscope tube, hence producing additional phase information not available heretofore. This provision indicates in a convenient manner the location of an anomaly, whether at an inside or an outside surface of the tubular member for instance.

The method of deriving different frequencies by the mathematical subtraction (or addition) method lends itself to miniaturization, greater compactness and to the use of standard and simplified building blocks which are readily available from commercial sources. Thus, a change in frequency is accomplished by the simple provision of switching to a different crystal operating at a predetermined resonant condition. The subtraction process in conjunction with other building blocks to be described hereafter provides a more compact and, hence, a more useful instrument which is portable for ease of handling and use at inspection sites. Furthermore, the new techniques used lend themselves the use of solid-state electronic circuitry which greatly enhances the reliability of the instrument and substantially reduces the power requirements.

A principal object of this invention is, therefore, the provision of a new and improved apparatus for testing metallic bodies by magnetic means.

Another principal object of this invention is the provision of a magnetic detecting apparatus for metallic tubular bodies made of non-magnetic material.

A further object of this invention is the provision of an improved magnetic testing apparatus for tubular bodies comprising a sensing probe adapted to be drawn through a tubular body and an electronic circuit displaying anomalies in such bodies, such circuit being operable at different frequences by means of frequency addition or subtraction means.

A still further object of this invention is the provision of a magnetic detecting apparatus having an electronic circuit portion which operates selectively at one of a plurality of discrete frequencies and which includes means for providing two output signals along two perpendicular axes for providing an indication of the nature of the anomaly detected by a sensing probe connected to the electronic circuit.

Further and still other objects of this invention will be more clearly apparent by reference to the following description when taken in conjunction with the accompanying drawing, in which:

FIG. 6 is a schematic electrical circuit diagram of an alternative embodiment of the present invention.

Figure 1:
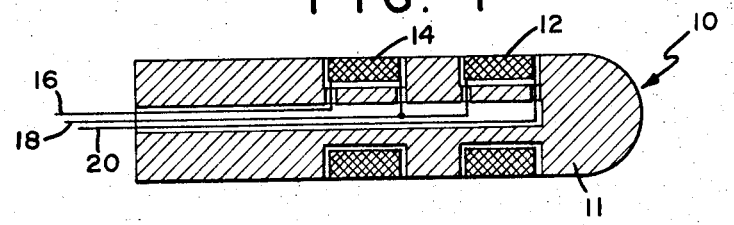
FIG. 1 is a longitudinal cross-sectional view of a sensing probe useful in conjunction with the electronic circuit of this invention.

Referring now to the figures and FIG. 1 in particular, a probe 10 is designed and shaped to be drawn through a tubular workpiece, such as a boiler tube or condenser tube. The probe comprises a non-magnetic body 11 supporting two axially spaced annular coils 12 and 14 which are connected to each other by means of electrical conductors 16, 18 and 20 as shown. The two coils 12 and 14 have substantially equal coil factors which means that they have the same number of turns of the same size of wire and are wound on substantially identical coil forms.

Figure 2:
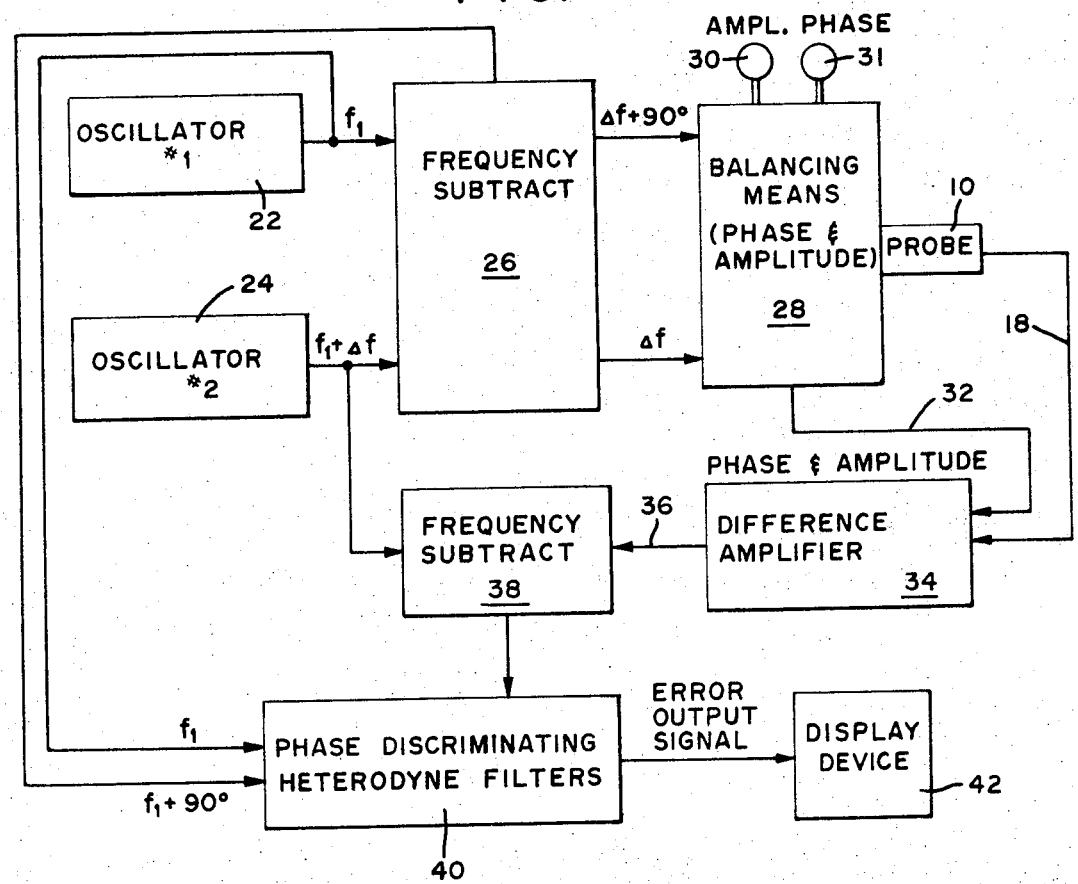
FIG. 2 is a schematic electrical circuit block diagram of the basic concept of the instant invention.

FIG. 2 is a simplified block diagram of the apparatus constructed in accordance with the present invention and shows a first high frequency oscillator, numeral 22, providing an output signal having a frequency $f_1$ (typically 500 KHz) and a second high frequency oscillator 24 providing an output signal having a frequency $f_1 + \Delta f$ (typically 500.5 to 700 KHz). The output signals are supplied to a frequency subtract circuit 26 which includes also a phase shift means. The signals supplied from the oscillators are phase shifted with respect to one another and subtracted to provide two new output signals, one being the difference frequency $\Delta f$ and the other being the same frequency, that is $\Delta f$, but phase shifted by 90° relative to the first stated signal.

The output signals from the frequency subtract circuit 26 are then fed to a balancing means 28 which includes adjustable controls 30 and 31 for varying the output signal provided along the conductor 32 used as an input signal to the error or difference amplifier 34. The sensing probe 10 is connected also to the balancing means 28. The phase and amplitude controls 30 and 31 serve to balance the error signal appearing at the output of the amplifier 34 when the probe or test conditions are being standardized.

When the probe 10 is coupled magnetically to a workpiece and provides along conductor 18 a signal to the amplifier 34, it will be apparent that the output from the difference amplifier appearing along the conductor 36 is responsive to the anomalies in the workpiece under test. The output from the amplifier 34 containing the error signal and harmonic distortion is supplied to a frequency subtracting circuit 38 which also receives a signal corresponding to the output signal provided by the oscillator 24. The frequency subtracting circuit 38 provides an output signal of the frequency $f_1$ to a phase discriminating heterodyne filter circuit 40 which is fed further with a signal corresponding to a frequency $f_1$ at 0° phase shift from the oscillator 22 and with a second signal at frequency $f_1 + 90°$ phase shift. The phase discriminating heterodyne filter circuit 40 provides a pair of output signals which are at a direct current level by phase discriminated 90° apart. Either one or both of these output signals are coupled to a display device 42 in order to display a signal which is characteristic of the anomalies detected. In the event of a strip chart recorder, a single output signal is used. With a cathode ray tube display both signals are used, each signal being fed to one of the input channels, whereby a signal display is obtained which in a most convenient manner is indicative of the amplitude and phase shift resulting from the defect sensed by the probe 10. By means well known from the prior art, the magnitude and location of the defect, its nature, etc. are readily determinable.

Figure 3:
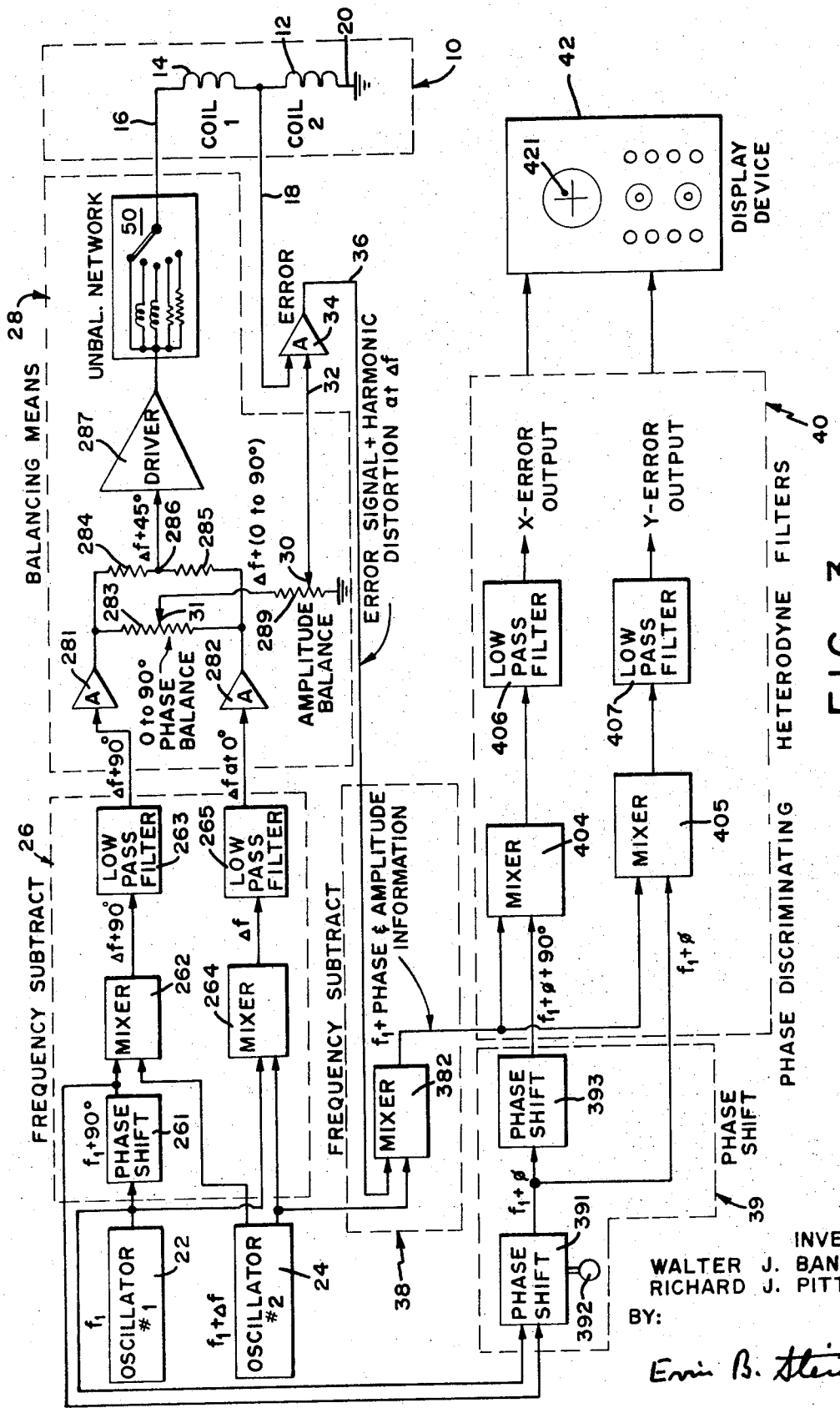
FIG. 3 is a schematic electrical circuit block diagram of the preferred embodiment of the invention and revealing additional details.

FIG. 3 is a more detailed electrical block diagram of the instant apparatus. The output signal having a frequency $f_1$ produced by the high frequency oscillator 22 is supplied to an electrical phase shift network 261 where the received signal is phase shifted by 90°, and the phase shifted signal, in turn, is supplied as an input signal to a frequency mixing means 262 which receives also a high frequency signal at the frequency $f_1 + \Delta f$ generated by the high frequency oscillator 24. The mixing means 262 generates a signal at the frequency $\Delta f$, but phase shifted by 90°, which signal is then supplied to a low pass filter means 263. A similar frequency mixing means 264 receives the output signal from the oscillator 22 at the frequency $f_1$ and a second signal from the oscillator 24 at the frequency $f_1 + \Delta f$ and produces a signal of the difference frequency $\Delta f$, without phase shift, which signal is applied to a low pass filter 265.

The output signals from the low pass filters 263 and 265, both at the frequency $\Delta f$, but one signal being phase shifted by 90° relative to the other signal, are fed to respective amplifiers 281 and 282 and subsequently supplied to a balancing means comprising a variable resistor 283 and into a resistive adder network comprising two resistors 284 and 285. The center tap 286 providing a sine wave signal at the frequency $\Delta f$ phase shifted by 45° relative to the signal from the low pass filter 265 is connected via a driver amplifier 287 to an unbalancing network 50 which contains switching means, a set of different impedances, such as resistors and inductances, but also a bypass connection in order to remove the unbalancing network 50 from the circuit. The purpose of the unbalancing network is to unbalance one of the probe coils so as to increase the sensitivity of the probe for extended anomalies, i.e. thinning of the wall thickness and the like. The circuit 50 is substantially similar to the unbalancing circuit (reference numeral 37) indicated in the heretofore mentioned patent to Datt supra.

The output signal from the driver amplifier 287, either modified by the unbalancing network 50 or unmodified, as illustrated, is connected to the conductor 16 of the probe 10 containing the probe coils 12 and 14 which, as shown in this illustration, are connected in the differential testing mode. The junction between the coils is connected via conductor 18 to an error amplifier 34, also known as differential amplifier, which receives, moreover, a balancing signal, conductor 32, from the variable tap coacting with the potentiometer 283 as modified by a further variable tap coacting with the potentiometer 289. The potentiometer 283 serves to adjust the phase angle of the signal and the potentiometer 289 the amplitude of the balancing signal so as to normalize or zeroize the output signal from the error amplifier 34 when setting up test conditions.

When performing tests any anomalies of the workpiece result in an unbalanced condition or deviation from the normalized condition, hence providing an error signal at the output side of the amplifier 34, which signal has a frequency $\Delta f$ and contains harmonic distortion information. This output signal is fed as an input signal along the conductor 36 to a mixing network 382 which receives also as a further input signal a signal corresponding to the output signal $f_1 + \Delta f$ from the oscillator 24. The mixing network acts as a frequency subtracting circuit to produce at its output an error signal of the frequency $f_1$ which contains phase and amplitude information related to the anomalies discerned by the test coils. The output signal produced by the mixing network 382 is then passed to a phase discriminating heterodyne filter circuit 40 which includes several individual circuits.

A phase shifting means 391 receives a signal $f_1$ from the output of oscillator 22 at zero phase shift and a signal from the output of phase shifting network 261, frequency $f_1$ phase shifted by 90°, and includes a control 392 in order to provide adjustable phase shift for the output signal. The output signal from the phase shifting means 391 is fed to a fixed phase shifting network 393 which produces an output signal to a mixing circuit 404 at the frequency $f_1$ plus adjustable phase angle as controlled by the control 392, plus 90° phase shift as provided by the phase shifting means 393. Mixing circuit 405 receives an input signal from the output side of the phase shifting means 391 and from the mixing circuit 382. The combination of the mixing circuits 404 and 405 together with the phase shift means contained in block 39 provides 360° variable phase rotation of the anomaly responsive signal produced by the error amplifier 36.

The output signals from the mixing circuit 404 and 405 are applied to respective low pass filters 406 and 407 to produce direct current level error output signals which are proportional only to the error information at the frequency $\Delta f$ from the differentially connected coils 12 and 14. The output signals from the low pass filters 406 and 407, on account of the phase shifting means 393, are phase discriminated 90° apart and remain 90° apart irrespective of the phase adjustment provided by the setting of adjustable control 392. Hence, both phase and amplitude information of the workpiece defect can be determined and when connecting the X and Y input terminals of a cathode ray oscilloscope 42 to the low pass filters, a defect may manifest itself as a spot 421 on the cathode ray tube display. Alternatively, a strip chart recorder can be connected to one of the output signals to indicate primarily amplitude variations of the output signal, although phase information can be discerned by the type of signal reversal obtained as is described in he publications noted heretofore.

It will be apparent that the phase shift means 391 is provided for rotating the display on the cathode ray tube and, if desired, may be omitted when this feature is not wanted.

Figure 4:
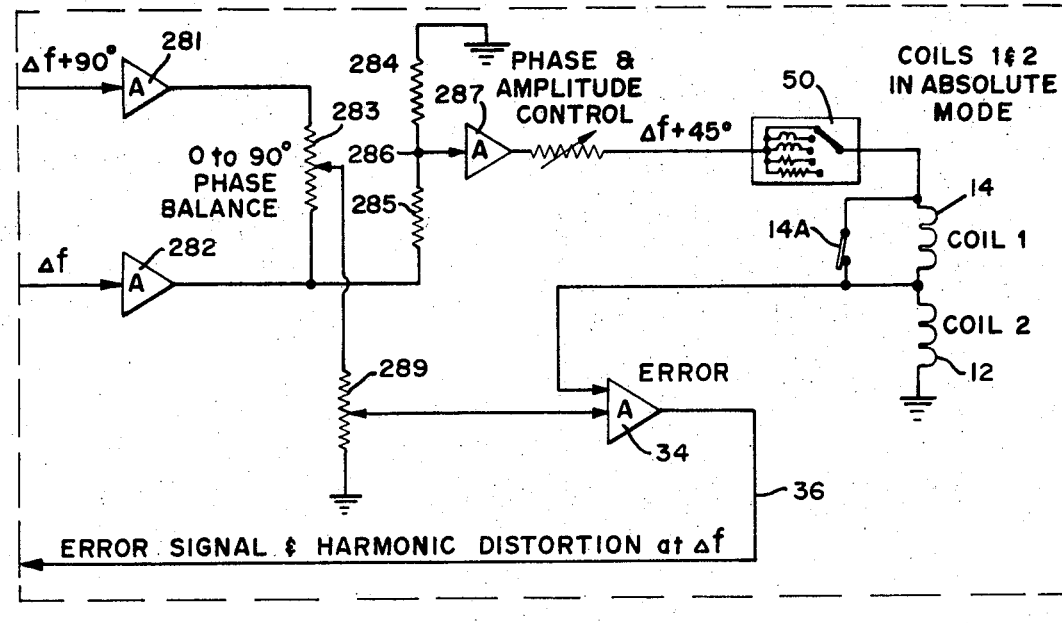
FIG. 4 is a schematic electrical circuit diagram of the invention showing a portion thereof with the probe coils connected in an alternative mode.

FIG. 4 shows the coils 14 and 12 connected in the absolute test mode as contrasted with the differential mode shown in FIG. 3. The change in connection is primarily a change in the network 284 and 285, i.e. disconnecting the resistor 284 from the output from the amplifier 281 and grounding it at one side, a series amplitude control which adjusts also the phase to provide the 45° shift of the signal, and the bypassing of the coil 14 by a switch 14A so as to retain only coil 12 as an active sensing element.

Figure 5:
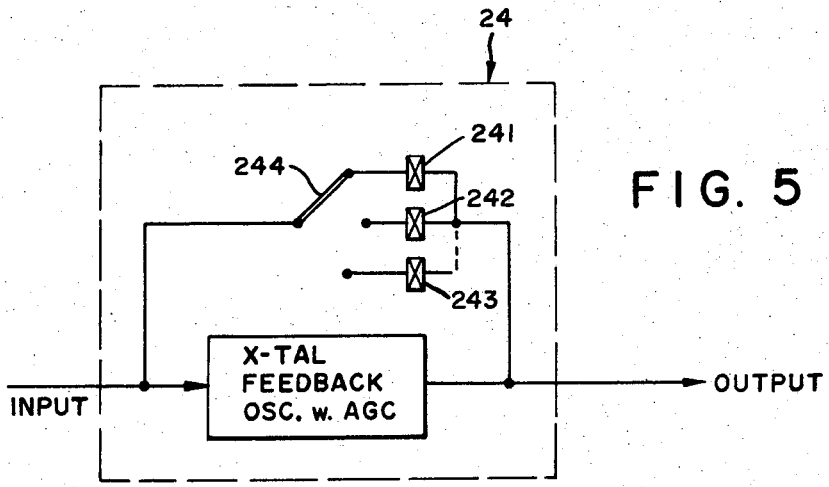
FIG. 5 is a schematic electrical circuit diagram of the oscillator means.

FIG. 5 shows the preferred arrangement for the oscillator 24 generating various frequencies. The basic circuit is that of a crystal controlled feedback oscillator having automatic gain control (AGC), see "Electronic Designers' Handbook" (book) by Robert W. Landee et al.; McGraw-Hill Book Company (1957) Library of Congress Catalog No. 56–6898; page 6–24; Figure 6–26. In order to vary the frequency there are provided several controlling crystals, 241, 242, 243, etc. which are selectively switched in circuit by a switch 244.

The above described arrangement has greatly extended the quantity of frequencies available. Whereas in the prior arrangement frequencies within a range of 40 KHz were available, the present circuit provides discrete frequencies within a range of 200 KHz, thereby greatly enhancing the test range of the apparatus.

It will be apparent to those skilled in the art that instead of frequency subtracting means, adding means may be used without departing from the principle of the invention.

FIG. 6 is an alternative circuit which will be useable for the present apparatus. However, the frequency range obtainable is greatly reduced in comparison to that attained with the preferred embodiment per FIGS. 1 through 5. The circuit per FIG. 6 uses a frequency subtraction means, mixing circuit 262, to produce a signal at the frequency $\Delta f$, which is the difference of the signals provided by the oscillators 22 and 24. The output signal from the mixing circuit 262 is supplied to a low pass filter 263, to an amplifier 281 and is applied as input to a bridge circuit which comprises the two probe coils 12 and 14 and two resistors 13 and 15 in respective branches of the bridge circuit. (It will be obvious that in the present connection the coils 12 and 14 have their individual leads brought out). The bridge circuit and differential or error amplifier 34 are balanced in phase and amplitude by means of the signals obtained from the variable sliders 13A and 15A so that the normalizing process is accomplished as explained hereinbefore. The coils 12 and 14 are connected in the differential mode.

The output signal 36, being responsive to anomalies of the workpiece under test as sensed by the test probe, is fed to the mixing circuit 382 which receives also an input signal from the output of the oscillator 24. The output signal from the mixing circuit 382 having a frequency $f_1$ is coupled to the mixing circuit 404 and to a low pass filter 406 to provide a single channel output signal. This embodiment constitutes the rather basic arrangement, providing limited information. By adding a variable phase shift means, numerals 391, 392 FIG. 3, the performance of the apparatus can be improved in that the sensitivity with regard to the orientation of the anomaly is rendered adjustable.

An improved embodiment as far as the output information is concerned comprises the adding of a second signal channel which provides an output signal which is 90° phase shifted with regard to the first output channel. This this end, phase shifting means 393 providing a 90° fixed phase shift is connected for receiving a signal from the output side of oscillator 22. The phase shifted signal obtained at the output side of phase shifting means 393 is coupled to a mixing circuit 405 which, in turn, is connected to the low pass filter 407. In this manner phase discrimination of the output signal from the differential amplifier 34 is achieved. If it is desired that the display be rotatable, an adjustable phase shift means, as shown in FIG. 3 reference numerals 391, 392, is connected in series with the phase discrimination means 393.

While the bridge circuit shown above comprises a set of resistors it will be apparent that capacitors and impedances may be used as is well known to those skilled in the art.

A further alternative embodiment comprises a modification of the coils wound upon the probe 10. With reference to FIG. 3, the input signal to the coils provided by the conductor 16 can be applied to a separate driving coil (third coil) which is connected to ground at its opposite end. The sensing coils 12 and 14 are connected in series with one another, but inductively coupled to the driving coil. The difference signal produced by the coils is coupled to the conductor 18 which, therefore, provides an anomaly responsive signal to the amplifier 34.

What is claimed is:

1. A magnetic detecting apparatus comprising:

oscillator means for providing electrical signals at a first frequency $f_1$ and at a second frequency $f_1 + \Delta f$;

means coupled for receiving said signals provided by said oscillator means and for producing a first output signal which is the difference frequency $\Delta f$ between said frequencies and for producing also a second output signal corresponding to said difference $\Delta f$ which is phase shifted relative to said first output signal;

a balancing means coupled for receiving said first and said second output signal and including phase shift means for providing a third output at the frequency $\Delta f$ which is phase shifted relative to said first and said second output signals responsive to the setting of said phase shift means, and said balancing means including means for providing another output signal serving as a balancing signal;

a sensing probe adapted to be inductively coupled to a workpiece, said probe having coil means coupled for receiving at an input connection said third output signal and providing a fourth output signal whose frequency is said difference $\Delta f$ and whose phase and amplitude, when testing a workpiece, is indicative of anomalies of a workpiece sensed by said probe;

difference means coupled to said probe for receiving said fourth output signal from said sensing probe and connected also for receiving said balancing signal from said balancing means for producing a fifth output signal at the frequency $\Delta f$ which is indicative of the difference of phase and amplitude between said signals received by said difference means;

means coupled for receiving said output signal from said difference means and a signal at the frequency $f_1 + \Delta f$ from said oscillator means and providing a signal at the frequency $f_1$ having phase and amplitude information indicative of the anomalies, and phase discriminating heterodyne filter means coupled for receiving said output signal from said last mentioned means and for receiving also signals from said oscillator means for providing direct current output signal information which is indicative of the anomalies sensed by said probe.

2. A magnetic detecting apparatus as set forth in claim 1, said balancing means including phase and amplitude adjusting means for balancing said fourth output signal provided by said difference means prior to testing a workpiece for anomalies.

3. A magnetic detecting apparatus as set forth in claim 1, said second output signal being phase shifted by substantially 90° electrical relative to said first output signal; said balancing means having means for causing said third output signal to be shifted by substantially 45° electrical; said balancing means also including adjustable phase and amplitude control means for causing said balancing signal to be variable in amplitude and phase from substantially 0° to 90° for balancing said fourth output signal provided by said difference means prior to testing a workpiece for anomalies.

4. A magnetic detecting apparatus as set forth in claim 1, said sensing probe including a pair of axially spaced coils.

5. A magnetic detecting apparatus as set forth in claim 1, said sensing probe including a pair of axially spaced coils coupled in series with one another.

6. A magnetic detecting apparatus as set forth in claim 5 and means for rendering one of said coils not responsive to anomalies.

7. A magnetic detecting apparatus as set forth in claim 1, said coil means comprising a pair of substantially equal coils, and impedance means disposed in series relationship with one of said coils for electrically unbalancing said one coil, and switch means for selectively connecting and disconnecting said impedance means from said one coil.

8. A magnetic detecting apparatus as set forth in claim 1, and phase shifting means coupled in circuit between said oscillator means and said phase discriminating heterodyne filter means for shifting said output signal information when displayed for visual observation.

9. A magnetic detecting apparatus as set forth in claim 8, said phase shifting means including control means for providing adjustable phase control for the displayed signal.

10. A magnetic detecting apparatus as set forth in claim 1, said oscillator means including a crystal controlled oscillator, a plurality of crystals of different frequency, and switching means coupled for selectively coupling one of said crystals in circuit to cause said oscillator means to provide a selected frequency.

11. A magnetic detecting apparatus as set forth in claim 1, said means for producing said first and second output signal including a frequency subtracting means.

12. A magnetic detecting apparatus as set forth in claim 1, and means coupled to said filter means for displaying said output signal information.

13. A magnetic detecting apparatus as set forth in claim 12, said means for displaying being a strip chart recorder.

14. A magnetic detecting apparatus as set forth in claim 12, said means for displaying including a cathode ray tube.

15. A magnetic detecting apparatus as set forth in claim 1, said phase discriminating heterodyne filter means including means for causing said output signal information to comprise two output signals having a 90° phase shift relation with respect to each other to provide amplitude and phase information.

16. A magnetic detecting apparatus comprising:

a pair of oscillator means providing respective signals at a frequency $f_1$ and a frequency $f_1 + \Delta f$;

means coupled for receiving said signals and providing a first output signal which is the difference frequency $\Delta f$ between said respective signals;

a sensing probe adapted to be inductively coupled to a workpiece, said probe including coil means for receiving at an input connection a signal responsive to said first output signal and providing a second output signal indicative of anomalies of a workpiece sensed by said probe;

phase and amplitude balancing means coupled in electrical circuit with said coil means;

a difference means coupled to said coil means and balancing means for producing a third output signal which is responsive to the setting of said balancing means and said second output signal provided by said coil means;

mixing means coupled for receiving said third output signal and for receiving a signal from said oscillator means to provide a fourth output signal having a frequency $f_1$ and including anomaly responsive information;

a heterodyne filter means coupled for receiving said fourth output signal and also a signal from said oscillator means for providing a fifth output signal which is indicative of the anomalies sensed by said probe, and means coupled to said filter means for indicating a value commensurate with said fifth output signal.

17. A magnetic detecting apparatus as set forth in claim 16, said coil means and said balancing means comprising in combination a bridge circuit.

18. A magnetic detecting apparatus as set forth in claim 17, said coil means comprising two axially spaced annular coils, said balancing means comprising two resistors having variable sliding contacts, said coils and resistors forming respective arms of said bridge circuit, and said contacts being coupled to said difference means.

19. A magnetic detecting apparatus as set forth in claim 16, said heterodyne filter means including two channels, and a phase shift means coupled in circuit between said oscillator means and one of said channels to provide phase discrimination for said fifth output signal.

20. A magnetic detecting apparatus as set forth in claim 19, said phase shift means providing substantially 90° phase shift to cause two output signals which are phase discriminated by substantially 90° with respect to one another.

* * * * *